United States Patent [19]

Olsson

[11] Patent Number: 5,109,231
[45] Date of Patent: Apr. 28, 1992

[54] RADAR ARRANGEMENT
[75] Inventor: Kjell Olsson, Järfälla, Sweden
[73] Assignee: Aktiebolaget Bofors Electronics, Jarfalla, Sweden
[21] Appl. No.: 653,865
[22] Filed: Feb. 8, 1991

Related U.S. Application Data
[63] Continuation of Ser. No. 585,641, Sep. 20, 1990, abandoned.

[30] Foreign Application Priority Data
Sep. 12, 1989 [CH] Switzerland .......................... 8902983

[51] Int. Cl.⁵ .......................... G01S 13/26; G01S 13/52
[52] U.S. Cl. ..................................... 342/145; 342/130; 342/163
[58] Field of Search ............... 342/129, 130, 145, 201, 342/163, 132

[56] References Cited
U.S. PATENT DOCUMENTS

| | | | |
|---|---|---|---|
| H767 | 4/1990 | Kretschner, Jr. et al. .......... | 342/145 |
| 3,878,525 | 4/1975 | Alpeis .............................. | 342/132 X |
| 4,078,234 | 3/1978 | Fishbein et al. ................. | 342/145 X |
| 4,142,189 | 2/1979 | Gleason ........................... | 342/145 X |
| 4,197,540 | 4/1980 | Rjggs et al. ..................... | 342/201 |
| 4,241,347 | 12/1980 | Albanese et al. ................ | 342/145 X |
| 4,328,495 | 5/1982 | Thue ............................... | 342/145 X |
| 4,338,604 | 7/1982 | Petitjean ......................... | 342/201 |

Primary Examiner—Gilberto Barrón, Jr.
Attorney, Agent, or Firm—Pollock, Vande Sande & Priddy

[57] ABSTRACT

A radar system comprises a transmitter which essentially continuously transmits a modulated carrier wave signal and a receiver for receiving the carrier wave signal reflected at an object (echo signal). The carrier wave signal is modulated with a code-generating signal whose code frequency is determined for the range resolution of the radar. The code-generating signal is such that one bit in the code has a duration which is several times longer than the period of the carrier wave signal and several bits of the code form a block which is obtained by modulation of a carrier wave with constant frequency. The frequency of the carrier wave is changed between blocks so that the transmitter sends a block with a carrier wave frequency which is different from the carrier wave frequency or frequencies which the receiver is set up to receive. The receiver stores the transmitted code and correlates it with the received signal. When code correspondence (synchronism) is obtained this corresponds to a definitive position of the echo response reflector. By changing frequency between blocks different "types of radar" can be dedicated to different range zones, and a radar system is obtained which is adapted to cope with modern threat environments. The radar is difficult to spot, difficult to define and to disturb.

15 Claims, 3 Drawing Sheets

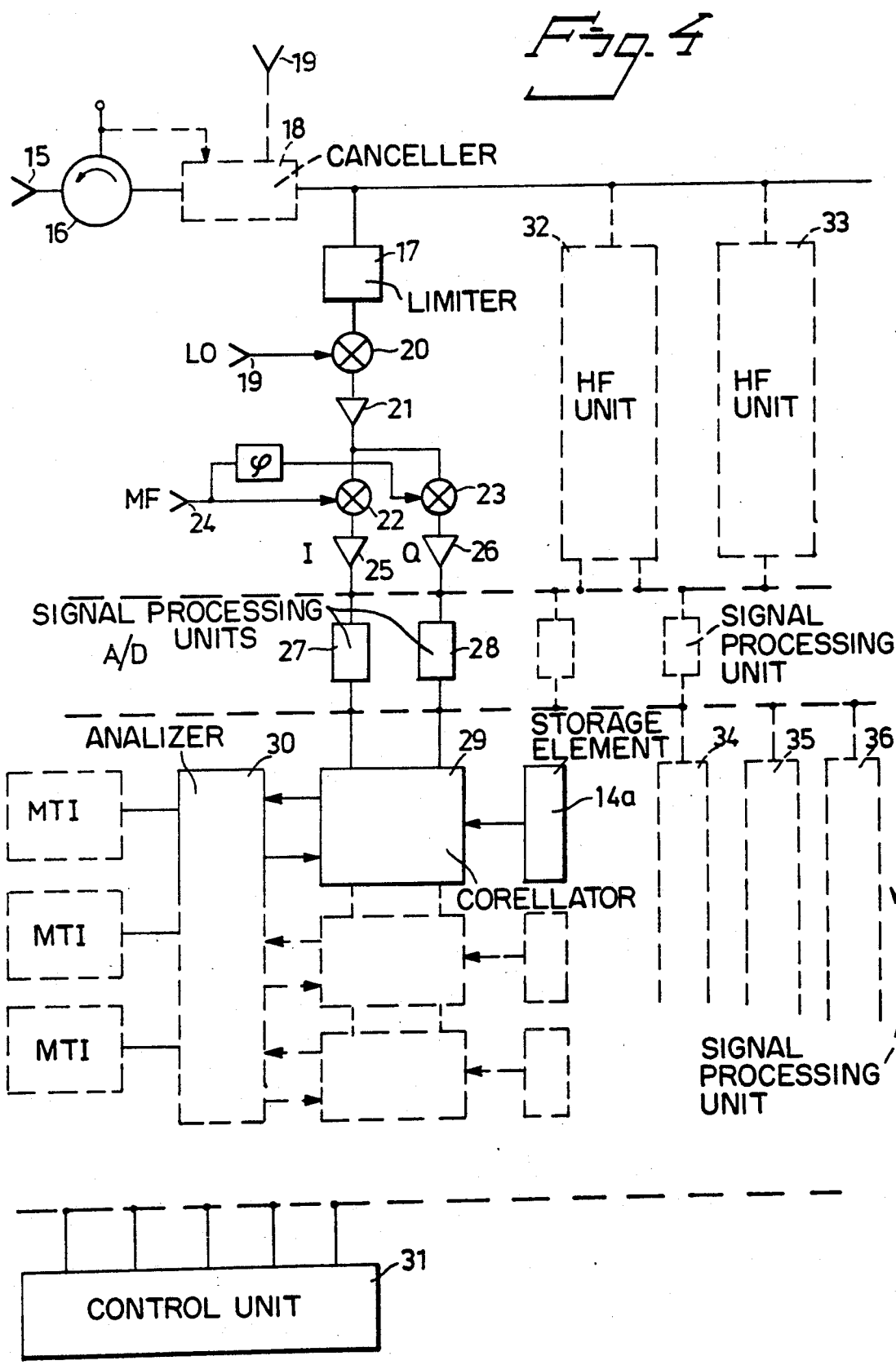

RADAR ARRANGEMENT

This is a continuation of Ser. No. 07/585,641, filed on Sep. 20, 1990, now abandoned.

FIELD OF THE INVENTION

The present invention relates to a radar arrangement of the type comprising a transmitter which essentially continuously transmits a modulated carrier wave signal and a receiver for receiving the carrier wave signal reflected at an object (echo signal).

BACKGROUND OF THE INVENTION

Radar can be considered as a device for measuring and communication. In a traditional pulsed radar, the radar sends out a pulse and measures the time for the echo from the reflecting object to reach the radar receiver. Echoes from different objects can have different appearances, for example, moving objects give a Doppler shift of frequency, and by analyzing the echoes, certain information about the reflecting object can be obtained. If the echo analysis can be said to constitute the measuring function of the radar, then the transmission of the pulse itself to the reflecting object and the transmission of the echo response back to the radar can be said to constitute the communication part of the radar.

In a way corresponding to radio communication, the radar's communication function is sensitive to interference and limited in range by wave propagation characteristics such as atmospheric attenuation, curvature of the earth and so forth.

The communication characteristics of the radar are particularly significant in military applications. Countermeasures which can prevent radar functioning are constantly being developed and the communication characteristics of the radar are critical with regard to how vulnerable the radar is to different countermeasure systems.

The radar can be disturbed actively or passively. In active interference, power is generated within the frequency range of the radar and is transmitted towards the radar which thereby experiences false echoes, which are often of such an amplitude and persistence that the receiver function is completely blanked out within certain parts of the radar coverage area. Passive interference involves creating decoys, for example by creating "clouds" of reflecting strips. The echoes from the strips can be so great that echoes from aeroplanes and boats do not stand out within the strip area.

In both passive and active interference, the party producing the interference thereby exposes its presence and its need for protective activity. It is frequently an important part of strategy to expose as little as possible of one's activities to the enemy. This means using neither radar nor countermeasures against radar until this is tactically justified.

To spot radar, signal interception devices are used. These are found in many versions, from simple warning receivers to highly advanced interception equipment with advanced analyzing functions.

Most of the signal interception equipment is designed for detecting radar pulses by a wide-band method which provides poor receiver sensitivity compared with a radar receiver. However, the radar loses more signal power due to the fact that the signal must go out and back to reach the radar receiver but only go one way to reach the signal interception equipment. This relation results in that the signal interception equipment can detect the radar at a longer range than the radar can see the actual target.

What has been said applies to traditional pulsed radars where the peak pulse power is much greater than the average power of the radar. The signal interception equipment is designed to sense the peak power, while the radar receiver senses the average power.

It is already known to use continuous wave (CW) radar. This has special characteristics, for example as warning radar for fast moving targets. If the radar transmits on one frequency, there must be a Doppler shift in the frequency of the echo signal for the received signal to be detected. This radar therefore does not provide any possibility for determining distance to the target. Other ideas for the CW radar have also been found. Most of the attempts with CW radar, however, have not led to any success, which is why radar signal interception equipment is frequently not equipped to spot such a radar. Moreover, for a CW radar it holds true that the peak power is equal to average power, which has the result that the signal interception equipment with its poor sensitivity can have a shorter range than the corresponding own range of the CW radar. That is to say that the radar can operate without being spotted. The radar is "quiet".

This is a very interesting characteristic of the radar since it must be known that there is a radar, the direction in which it is located and on what frequencies it transmits in order to be able to define a disturbance of the radar.

It is already known to be able to obtain range information from CW radar, for example by coupling together two or more radars to obtain a calculated point for the echo by interception technique. Another way to obtain range information by means of one radar is to use so-called frequency modulated continuous wave (FMCW) radar where the frequency of the transmitted carrier wave is changed (increased) continuously with time. An example of this type of radar is the PILOT radar developed by Philips. Like conventional CW radar, the FMCW radar is difficult to spot and is "silent". However, the risk that this type of radar can also be disturbed is increased as a result of more sophisticated countermeasures. Besides, the frequency modulation of the FMCW radar can provide an error in range determination upon detection of moving targets.

There is another type of radar on the market which should be mentioned in this connection, namely the so-called travelling wave tube (TWT) radar. Unlike a traditional pulsed radar, where the radar transmitter comprises a magnetron tube which transmits short pulses of the order of magnitude of 0.05–5 μs with high power, a travelling wave tube is utilized in TWT radar. Such a tube cannot provide peak powers of the same magnitude as a magnetron, which is why the pulse durations need to be increased in order to obtain corresponding avarage powers. The advantage with TWT radar is that it can provide good MTI characteristics. The disadvantage is the poor range resolution compared with conventional pulsed radar.

To increase the range resolution in TWT radar, it is already known to vary the frequency or phase in the transmitted pulse. This can be done by analog or digital means and provides a certain pulse compression which increases the range resolution of the radar.

The TWT radar is also a pulsed radar which can be easily spotted by signal interception equipment.

SUMMARY OF THE INVENTION

The object of the present invention is to produce a new type of radar which is difficult to spot by signal interception equipment and difficult to analyze and, moreover, difficult to disturb, with a design which provides good radar performance for MTI, range accuracy and so forth.

A further object of the invention is to produce a radar in which the expensive high-power technology at the transmitter end has been reduced but which, nevertheless, has increased functionality compared with traditional radar.

By way of introduction, it emerges that the present invention is in principle a CW radar, which transmits and receives information at the same time and continuously in time, in contrast to a traditional pulse radar.

To obtain a good resistance to interference and reliability, coding of information is used in information transmission which provides redundancy both in time and frequency to produce a robust communication system.

According to the invention, the radar transmits long coded messages in contrast to traditional radar which transmit one bit in order of magnitude,
  the range resolution of the radar is determined by the code frequency of the message,
  the coded message of the radar is divided up into blocks, the RF frequency being changed between blocks,
  the code frequency is considerably higher than the corresponding block frequency and the RF signal can be coded by means of frequency coding, phase coding, amplitude coding or a combination of several coding methods,
  the radar sends out a code block at a frequency which is different from the frequency or frequencies received by the radar,
  the radar stores the transmitted code message and correlates the incoming echo response with the stored message. When code correspondence (synchronism) is obtained, this corresponds to a definitive position of the echo response reflector,
  by changing frequency between the blocks, different range zones can be treated in different ways, that is to say different "types of radar" can be dedicated to different range zones.

BRIEF DESCRIPTION OF THE DRAWINGS

A preferred embodiment of the invention is shown diagrammatically in the attached drawings, in which FIG. 4 shows in a block diagram form the basic construction of the receiver.

DETAILED DESCRIPTION OF THE PREFERRED EMBODIMENT(S)

Figure 1:
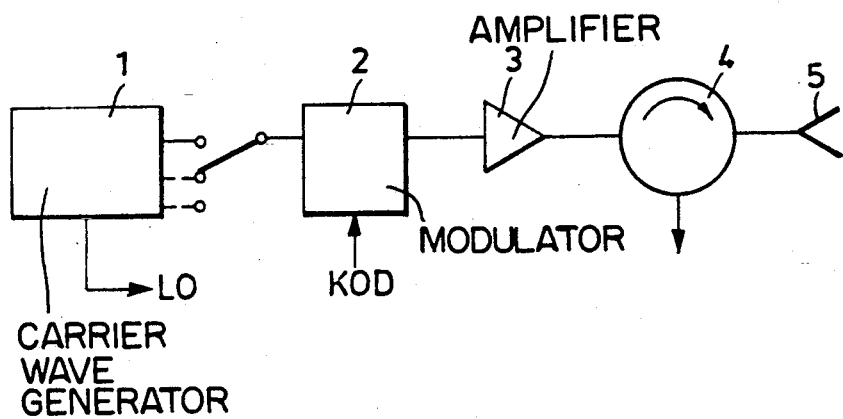
FIG. 1 shows the basic construction of the transmitter.

The transmitter shown in FIG. 1 comprises a carrier wave generator 1 of the type which continuously transmits a carrier wave signal, the signal is supplied to a modulator 2 for modulation with a code-generating signal whose fundamental frequency, the code frequency, is determining for the range resolution of the radar. The transmitter also comprises a power amplifier 3 for the modulated carrier wave signal, circulator 4 and transmitter antenna 5.

Figure 2:
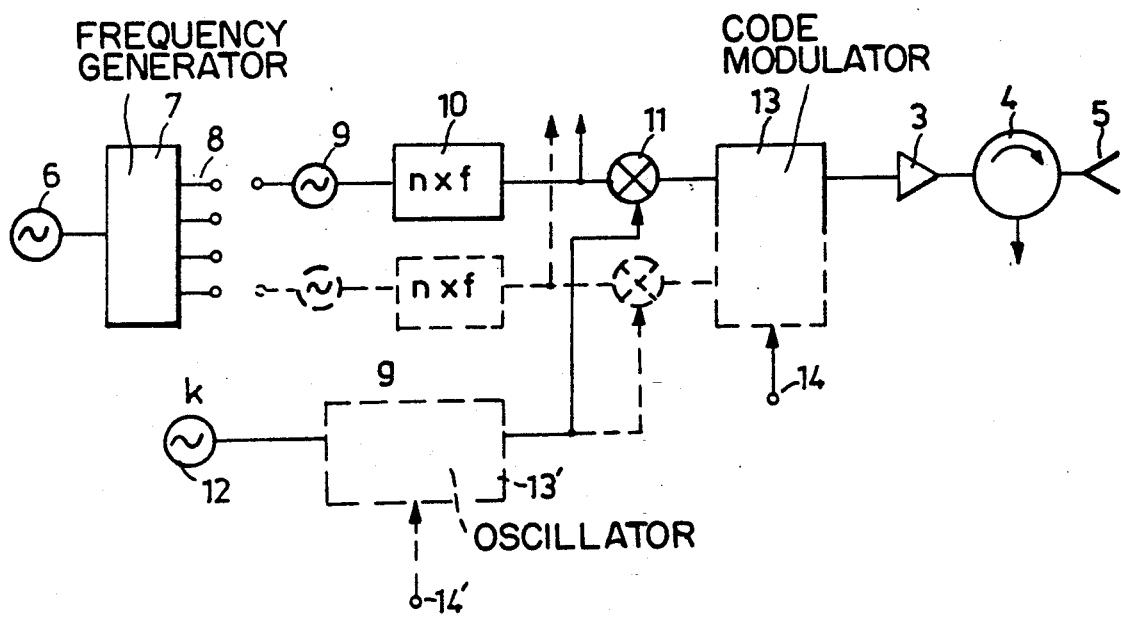
FIG. 2 shows an example of how frequency generation and modulation are created in the transmitter.

FIG. 2 shows in slightly more detail an example of how the frequency generation and modulation can be produced. The transmitter arrangement consists of a stable oscillator 6 whose oscillator signal is supplied to a frequency generator 7 whose output has a switch 8 for coupling-in of one or more phase-locked oscillators 9. The phase-locked frequency signal is supplied to a frequency multiplier 10. To obtain a suitable transmitting frequency, mixing takes place at 11 with an intermediate frequency generated in an intermediate-frequency oscillator 12. The transmitting frequency or transmitting frequencies generated are supplied to a code modulator 13 for code modulation with a code-generating signal 14. Alternatively, code modulation can be carried out at the intermediate frequency level, which is indicated in the figure by the code modulator 13'. The code-modulated carrier frequency signal is thereafter supplied in a known manner to the circulator and transmitting antenna of the transmitter.

As mentioned above, the circuit for frequency generation and modulation described above constitutes only one example. Several alternative embodiments can occur within the context of the invention.

The code-generating signal 14 is of such a nature that one bit in the code has a duration which is several times longer than the time of the period of the carrier wave signal and that a code with several bits forms a block, a block being characterized by modulation of a carrier wave with constant frequency.

The carrier wave frequency is furthermore changed between blocks so that the transmitter transmits one block with a carrier wave frequency which is different from the carrier wave frequency or frequencies which the receiver is set up to receive.

The block length can be made considerably shorter than the corresponding range of the radar, which means that the radar transmitter frequently changes frequency during the time it takes to obtain an echo response from the range limit, which increases robustness with respect to detection and interference.

The coding is produced by either phase modulation, frequency modulation, amplitude modulation or a combination of these methods. For example, the coding of the carrier frequency signal can be done by means of biphase coding as binary code, in which one of the two phases is allocated to each bit.

Alternatively, the carrier frequency signal can be coded by means of frequency coding as binary code, in which one frequency of the two is allocated to each bit, or in which the power is such that the result can be considered as two amplitude-modulated codes, each with its own frequency, in which the amplitude modulation is complementary so that, when the radar is transmitting one bit at one frequency, it is not transmitting on the second frequency.

The coding of the carrier frequency can utilize more phase positions or more frequencies than in the case of the binary code and thus less errors are contributed to the correlation result in the receiver due to longer codes.

Figure 3A:
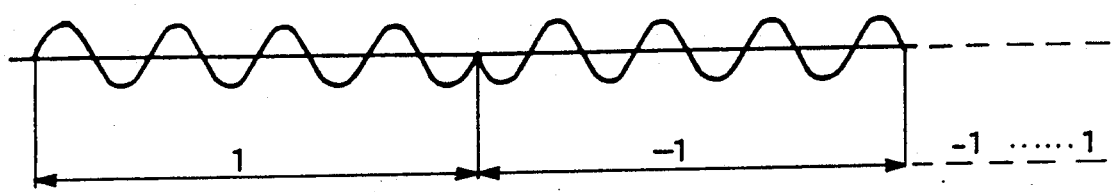
FIGS. 3a, 3b, 3c show an example of how the code-generating signal can look.
Figure 3B:
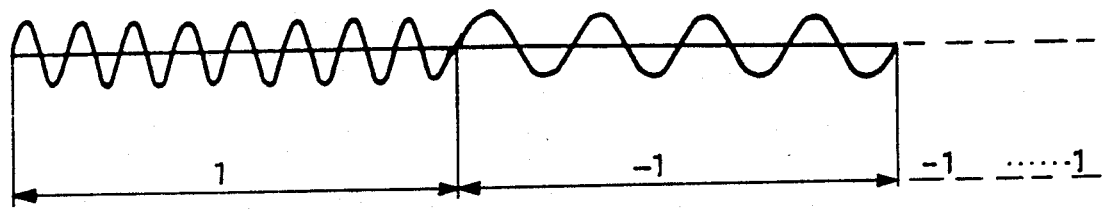
Figure 3C:
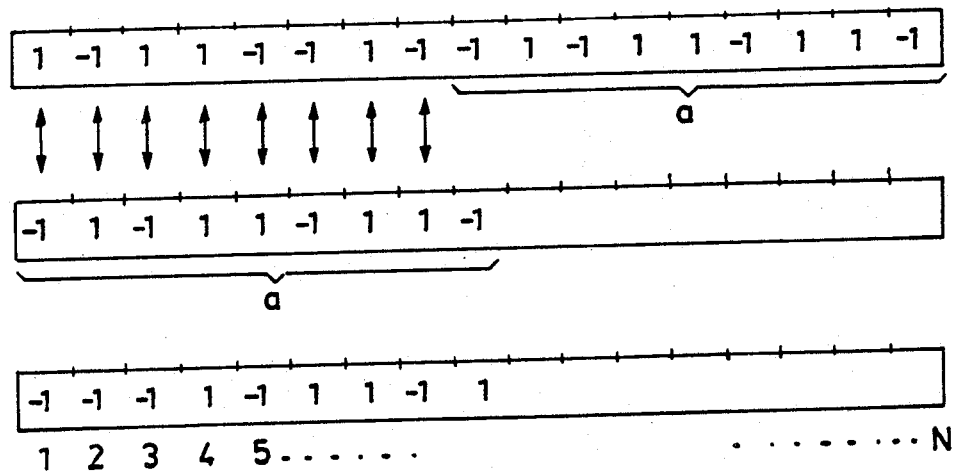

FIG. 3 shows an example of a code-generating signal 14, in this case a biphase coding with a 180° phase shift (a) and a frequency coding (b). The code-generating signal can be generated in a known manner by known code sequences being stored or generated randomly or generated by means of given algorithms.

FIG. 4 shows an example of the receiver construction. An echo from the transmitted modulated carrier wave signal is received by an antenna 15. Any interference signals are also received by the antenna. Via a circulator 16, the received signal reaches the receiver circuit itself which comprises a receiver protection 17 in the form of a limiter and possibly a filter which admits the intended receiver signal frequency band but blocks the signal frequency of the transmitter, among others.

If necessary, a so-called canceller 18 can be introduced in the receiver chain. This can provide extra protection against incoming transmitter power in the receiver by tapping off power from the transmitter channel and adjusting the phase and amplitude of this part of the transmit signal and thereafter introducing it in opposite phase to the part of the transmitter signal which is leaking through the circulator 16 or is reflected after the circulator and in the vicinity of the antenna.

The canceller 18 can also be designed to suppress interference which is received from the sidelobes of the antenna. In this arrangement a signal is derived from an additional antenna 19 and this signal is adjusted in phase and amplitude so that the interference coming in via the main antenna 15 is blanked out, for example suppressed.

The LO signal 19 of the radar is mixed in a mixer 20 with the receiver signal frequency to form an intermediate frequency (IF). The signal is supplied to a filtering and amplifying circuit 21 and thereafter mixed in mixers 22 and 23 with an IF signal 24 supplied to form a video signal. The video signal is taken out as an I channel and a Q channel, 25 and 26, respectively, by rotating the IF signal 24 supplied by 90° before the one mixer 23. I and Q channels are required for retaining the phase information which, in turn, is required for synchronous detection and coherent MTI operation.

Sampling and A/D conversion in the signal processing elements 27, 28, which may be located already at the IF level, are followed by digital signal processing. The requirement for dynamic range in the A/D converters and later signal processing elements can be limited by introducing controlled attenuation of the receiver signal (for example STC) in the receiver protection 17 and/or in the intermediate-amplification section.

In the digital signal processing, the received signal can be correlated with the code which has been stored in element 14a and is the same one which the transmitter sent out earlier and which has reached the range zone of interest to the receiver and has now come back to the receiver. The correlator 29 can be constructed in different lengths to match current code lengths. The correlator can also be equipped with a correction function which uses the primary result of the correlation, and if this value is greater than a value given before, the error contribution of this value to the correlation results received earlier or later thereby is calculated and these values are adjusted correspondingly which involves a successive storage of the primary results of the correlation before the adjustments are clear and the adjusted, secondary correlation results are used for further signal processing. An analyzer 30 assembles the values from the different code blocks in a suitable manner on the basis of the actual Doppler characteristics of the target and so forth.

After the analyzer 30, several different functions can be carried out in a corresponding manner as in a traditional pulsed radar.

The digital signal processing part is connected to control electronics 31, known per se, for power, display, communication, processes and so forth.

In FIG. 4, further HF units 32, 33 have also been marked by dashed lines which indicate the capability of the radar to receive radar echoes of more than one carrier frequency at the same time. These HF units can be coupled together to the same signal processing unit or switched to further signal processing units 34, 35, 36 marked by dashed lines in the figure to indicate the capability of the radar to analyze echoes from different range zones with different signal processing functions at the same time.

In the radar, the range information is obtained in the following way. The code sent out is stored in the receiver and correlated with the received signal. When synchronism with the incoming signal is obtained, the contributions from the individual code bits are summed together. This position in time defines the range to the object which has reflected the corresponding coded carrier wave signal sent out from the transmitter, see FIG. 3c. This figure shows the relationship when the a first bits of the transmitted and stored code have reached the receiver and been stepped on. With each stepping-on, the contents in compartment 1 are multiplied by each other, the contents in compartment 2 are multiplied by each other and so forth so that a number of products is formed in the product register. The sum of the a first compartments in the product register is $-1$ in the example above. Since the echo response is in exact synchronism with the stored code, the sum $+N$ is obtained instead, that is to say all multiplications have separately become $+1$.

The receiver can be constructed to receive at the same time the signal from blocks at at least two different frequencies, and the signals are processed differently in the receiver by division in frequency. For example, the block reflected from the near zone of the radar can be selectively attenuated in the receiver relative to the block which is reflected from the far zone of the radar in order to reduce in this way the requirement for dynamic range in the signal processing unit of the receiver.

The fact that the receiver can receive at the same time the signal from blocks at at least two different frequencies implies that the receiver can dedicate certain analyzing functions to a certain range zone and partially other analyzing functions to another range zone by selecting corresponding blocks which have been reflected from the respective range zone and coupling them to respective analyzing functions in the receiver. For example, one range zone can be analyzed with respect to Doppler effects of moving targets and a second range zone can be analyzed with respect to a good range resolution of the target.

Where the coding is carried out by means of frequency modulation of the carrier frequency, each frequency can be separately decoded in a first step. The amplitude code obtained in this manner is correlated with the stored code in the receiver. In this case, samples are obtained in the compartments when, according to the code, no power will be found as echo from an actual range. When these samples are assembled, they provide a measure of the size of radar echoes which do not originate from the correct range and are thus not synchronous. If the radar is exposed to an interference, the samples of this interference can provide a measure of the actual interference power. If the code is designed in such a way that over a given number of code bits, n, the number of bits of one binary frequency is equal to the number of bits of the second binary frequency, displacements of the code by one or more bits provide a small and known contribution to the correlation.

An important characteristic of the present invention radar is that it can dedicate different radar functions to different range zones. Traditionally, a radar has the same function over all of its range zone, which means that if top performance is required for one function in one zone and a second function in a second zone, all requirements are added up to contain at the same time all good characteristics over the entire coverage zone of the radar.

The radar according to the present invention which transmits different blocks can assign the reception of different blocks to different receiver functions. For example, the radar can be used in an application as follows.

The near zone will have simple surveillance. In a medium zone, vehicles will be fought with a battery and the radar will have a high resolution and good fire control characteristics in this area. An outer zone will be especially monitored for fast low-flying aeroplanes or missiles.

In a simple basic model, the radar can here dedicate a powerful high-resolution receiver function without MTI to the middle zone while the outer zone can have low range resolution with good MTI. By dedicating just that radar performance required for a certain task to the actual zone, costs can be kept low and at the same time it is simpler to produce better performance from one function if it is not required, at the same time, to force performance from all other functions.

Where the coding is carried out by means of phase modulation, the correlator is preferably constructed of several subunits, where the correlation results from a respective subunit are stored for more than one position in time so that the results from the different subunits can be assembled in different time sequences. A summation of the results of the subunits in a certain time sequence thereby corresponds to a phase shift of the moving target due to the Doppler effect in a corresponding speed interval. Such a division of the correlator into several subunits provides the possibility of detection also of moving targets which otherwise would "disappear" due to phase displacement.

I claim:

1. A radar detecting system comprising a transmitter which substantially, continuously transmits a modulated carrier wave signal, and a receiver for receiving the carrier wave signal reflected from an object, said transmitter including:

means for generating a carrier wave signal;
means for modulating said carrier wave signal with a code-generating signal having a fundamental code frequency for determining the range resolution of the radar, said code generating signal being of such a nature that a bit in the code has a duration which is several times longer than the period of the carrier wave signal and several bits in the code form a block, and wherein each block of the code-modulated carrier wave signal is obtained by modulation of a carrier wave with constant frequency;
means for changing the carrier wave frequency between blocks so that the transmitter transmits one block with a carrier wave frequency which is different from the carrier wave frequency or frequencies which the receiver is set up to receive;
said receiver including means for storing the code generating signal of the transmitted code-modulated carrier wave signal, and correlator means for correlating the stored code signal with the received signal so that, when synchronism between said stored code signal and the received signal is obtained, the contributions from the individual code bits are summed together, and this position in time thereby defines the range to the object which has reflected a corresponding code-modulated carrier wave signal transmitted from the transmitter.

2. A radar detecting method for a radar system including a transmitter which substantially, continuously transmits a modulated carrier wave signal, and a receiver for receiving the carrier wave signal reflected from an object, said method including the steps of:

generating a carrier wave signal;
modulating said carrier wave signal with a code-generating signal having a fundamental code frequency for determining the range resolution of the radar, said generated code signal selected so that a bit in the code has a duration which is several times longer than the period of the carrier wave signal and several bits in the code form a block; and wherein each block of the code-modulated carrier wave signal is obtained by modulation of a carrier wave with constant frequency;
changing the carrier wave frequency between blocks so that the transmitter transmits one block with a carrier wave frequency which is different from the carrier wave frequency or frequencies which the receiver is set up to receive;
storing the transmitted code generating signal in a storing means of the receiver and
correlating the stored code signal with the received signal so that, when synchronism between said stored code signal and the received signal is obtained, the contributions from the individual code bits are summed together, and this position in time thereby defines the range to the object which has reflected a corresponding code-modulated carrier wave signal transmitted from the transmitter.

3. A radar system according to claim 1, wherein said carrier wave modulation is either phase modulation, frequency modulation, amplitude modulation or a combination thereof.

4. A radar system according to claim 1, wherein the receiver includes means for simultaneously receiving the signals from code blocks at at least two different carrier frequencies and processing the signals of different frequency with different signal processing in the receiver.

5. A radar system according to claim 1, wherein the receiver includes selective attenuation means for attenuating the block which has been reflected from a near range zone of the radar relative to the block which has been reflected from the far range zone of the radar to reduce the requirement for dynamic range in a signal processing unit of the receiver.

6. A radar system according to claim 1, wherein the means for changing the carrier wave frequency produces a block length which is considerably shorter than the corresponding range of the radar, to increase the robustness with respect to detection and interference.

7. A radar system according to claim 1, wherein the receiver designates certain signal processing to one range zone and partially other signal processing to another range zone by selecting the corresponding received response signal blocks which have been reflected from a respective range zone and coupling these to respective signal processing in the receiver.

8. A radar system according to claim 7, which includes the further steps of analyzing a response signal of at least one range zone with respect to a Doppler effect of moving targets and analyzing a response signal of at least one range zone with respect to good range resolution of a target.

9. A radar system according to claim 1, wherein the code generating signal is biphase coded with a binary code wherein one of two phases is allocated to each bit.

10. A radar system according to claim 1, wherein the code generating signal frequency is coded as binary code wherein one of two frequencies is allocated to each bit and wherein a power is such that the result can be considered as two amplitude-modulated codes, each with its own frequency, and wherein the amplitude modulation is complementary in such a manner that, when the radar is transmitting one bit in one frequency, there is no transmission on the other frequency.

11. A radar system according to claim 1, wherein the correlator includes correction means which uses a primary result of the correlation and when a primary correlation value is greater than a predetermined value, an error contribution of said primary correlation value to the correlation results obtained earlier or later is calculated for corresponding adjustment of the earlier and later correlation values, whereby a progressive storage of the primary results of the correlation before the adjustments is cleared and adjusted secondary correlation results are used for further signal processing.

12. A radar system according to claim 11, wherein the correlator means in a first step produces decoding for each frequency of the frequency modulated carrier signal and the obtained amplitude code is correlated with the code generating signal stored in the receiver so that samples which are obtained in the compartments, in which in correlation with the code no power is found as received carrier wave signals (echo) from an actual range, are being summed to provide a measure of the magnitude of received carrier wave signals (echo) which do not originate from the correct range and are therefore not synchronous with the code generating signal whereby providing a measure of the actual interference power to which the radar is exposed.

13. A radar system according to claim 12, wherein the code is designed in such a manner that over a given number n of code bits, the number of bits of one binary frequency is equal to the number of bits of a secondary binary frequency whereby any displacements of one or more code bits provide a small and known contribution to the correlation.

14. A radar system according to claim 1, wherein the correlator means includes several subunits and storage means for storing correlation results from each respective subunit for more than one position in time, so that the correlation results of different subunits can be summed in different time sequences, and a summing device for summing the correlation results of the subunits in a certain time sequence which corresponds to a phase displacement of a moving target due to the Doppler effect within a corresponding speed interval.

15. A radar system according to claim 1, wherein the receiver comprises a plurality of modules including HF units, followed by A/D conversion and signal processing units, the modules being interconnectable such that said HF units are adapted to be coupled to one common signal processing unit or to be shifted to different signal processing units, whereby echo response signals from different range zones can be analyzed by different signal processing units.

* * * * *

UNITED STATES PATENT AND TRADEMARK OFFICE
CERTIFICATE OF CORRECTION

PATENT NO. : 5,109,231
DATED : April 28, 1992
INVENTOR(S) : Kjell Olsson It is certified that error appears in the above-identified patent and that said Letters Patent is hereby corrected as shown below:

On title page, delete the following:

[30] Foreign Application Priority Data

Sept. 12, 1989 [CH] Switzerland................8902983

Signed and Sealed this

Twenty-second Day of March, 1994

*Attest:*

BRUCE LEHMAN

*Attesting Officer*     *Commissioner of Patents and Trademarks*